(12) United States Patent
Miyazawa

(10) Patent No.: US 6,389,172 B1
(45) Date of Patent: May 14, 2002

(54) IMAGE PROCESSING APPARATUS AND STORAGE MEDIUM THAT STORES PROGRAM ASSOCIATED WITH THE APPARATUS

(75) Inventor: Atsushi Miyazawa, Tokyo (JP)

(73) Assignee: Namco Limited (JP)

( * ) Notice: Subject to any disclaimer, the term of this patent is extended or adjusted under 35 U.S.C. 154(b) by 0 days.

(21) Appl. No.: 09/189,767

(22) Filed: Nov. 10, 1998

(30) Foreign Application Priority Data

Nov. 13, 1997 (JP) .............................................. 9-329605

(51) Int. Cl.⁷ ................................................ G06K 9/36
(52) U.S. Cl. ........................................ 382/237; 382/270
(58) Field of Search ......................... 382/237, 270–273; 358/456–460

(56) References Cited

U.S. PATENT DOCUMENTS

| | | | | |
|---|---|---|---|---|
| 4,651,293 A | * | 3/1987 | Kato ........................... | 364/202 |
| 5,341,464 A | * | 8/1994 | Friedman et al. ........... | 395/131 |
| 5,710,828 A | * | 1/1998 | Hashimoto .................. | 382/172 |
| 6,097,502 A | * | 8/2000 | Shu et al. .................... | 358/1.9 |

* cited by examiner

Primary Examiner—Thomas D. Lee
Assistant Examiner—Stephen Brinich
(74) Attorney, Agent, or Firm—Morrison & Foerster LLP

(57) ABSTRACT

A pseudo random number pattern which does not contain the minimum and maximum gradation values of pixels of input image data, and consists of, as elements, threshold values set at nearly equal intervals, is generated, and input image data is binarized by ordered dithering using this pseudo random number pattern. Since the elements of the pseudo random number pattern do not contain the minimum and maximum gradation values of the pixels of the input image data, even when a binary image is input, noise components, i.e., black or white isolated pixels can be prevented from periodically appearing. Since the threshold values of the pseudo random number pattern are set at nearly equal intervals, a dither image with quality as high as that can be obtained by the conventional method can be obtained even when a halftone image is input.

2 Claims, 3 Drawing Sheets

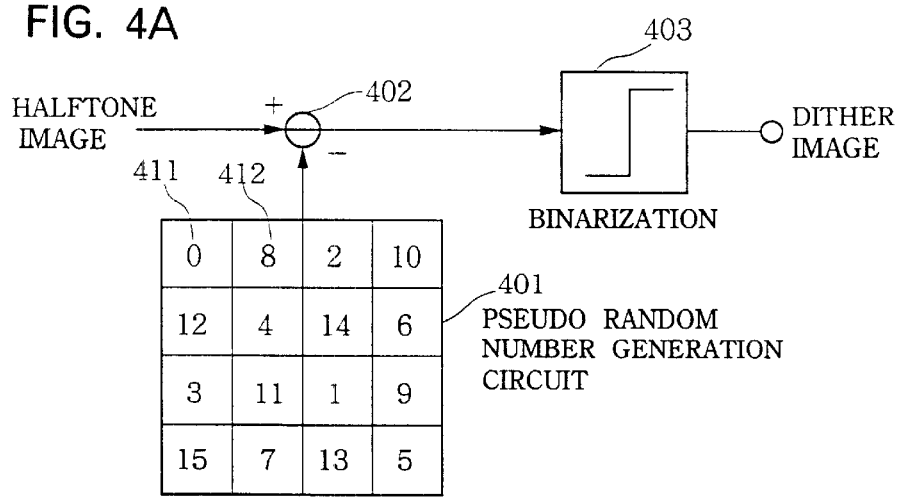

FIG. 5A    PRIOR ART
$$D2n = \begin{pmatrix} 4Dn, & 4Dn + 2Un \\ 4Dn + 3Un, & 4Dn + Un \end{pmatrix}, \quad D1 = 0, \quad UK = \begin{pmatrix} 1 \cdots 1 \\ \vdots & \vdots \\ 1 \cdots 1 \end{pmatrix}$$
FIG. 5B    PRIOR ART
| 0 | 136 | 34 | 170 |
|---|---|---|---|
| 204 | 68 | 238 | 102 |
| 51 | 187 | 17 | 153 |
| 255 | 119 | 221 | 85 |
501
FIG. 6    PRIOR ART
601
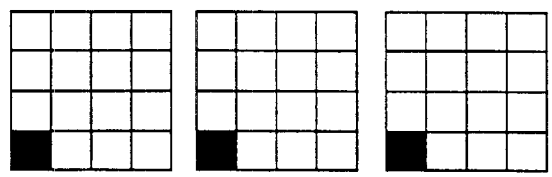
602

IMAGE PROCESSING APPARATUS AND STORAGE MEDIUM THAT STORES PROGRAM ASSOCIATED WITH THE APPARATUS

BACKGROUND OF THE INVENTION

1. [Field of the Invention]

The present invention relates to an image processing apparatus for converting input image data into black/white binary image data and, a storage medium that stores a program associated with the apparatus.

2. [Description of the Related Art]

Binarization for converting a halftone image into a black/white binary image is used not only in processing of image data (e.g., texture source images in game machines or the like) but also in every field of image signal processing such as facsimile, OCR (optical character reader), medical image processing, visual robot, and the like. As a conventionally popular binarization method, a pseudo halftone display method based on so-called "ordered" dithering, which superposes random numbers or pseudo random numbers (periodic random numbers) on a halftone image, and then A/D (analog/digital)-converts the halftone image, is known. As a method of giving random numbers or pseudo random numbers used, a Bayer pattern is preferably used.

FIG. 4A shows the principle of binarization based on "ordered" dithering. FIG. 4B shows an example of a halftone image to be input to the binarization shown in FIG. 4A. A halftone image 420 shown in FIG. 4B consists of a set of 16(=4×4) pixels (dots) 421, 422, . . . The numeral in the box of each pixel represents the gradation value of that pixel. For example, "8" is described in the box of the pixel 421, and "7" is described in the box of the pixel 422. These values respectively represent the gradation values of the corresponding pixels. In this case, the gradation level of each pixel is expressed by a numerical value ranging from 0 to 15 (i.e., 16 gradation levels).

In the binarization shown in FIG. 4A, when the halftone image 420 is input, a pseudo random number generator generates a pseudo random number (Bayer) pattern having 16(=4×4) elements, and a subtracter 402 subtracts the corresponding element values of a pseudo random number pattern 401 from the gradation values of the individual pixels of the halftone image 420. For example, a random number "0" of an element 411 in the pseudo random number pattern 401 is subtracted from the gradation value "8" of the pixel 421 in the halftone image 420, and subtractions between the corresponding pixels and elements are similarly done. A discrimination circuit 403 outputs a dither image as a result of binarizing an element equal to or larger than 0 (or an element that exceeds 0) to 1 (means white) and an element that does not exceed 0 (or an element equal to or smaller than 0) to 0 (means black) in the subtraction results from the subtracter 402. In this case, 1 indicates white, and 0 black. But 1 may indicate black, and 0 white. The same applies to the embodiment of the present invention to be described later.

In the description of FIG. 4A, binarization is done by the subtracter 402 and discrimination circuit 403. To summarize, this processing compares the gradation values of the individual pixels in the halftone image 420 with the element values (to be referred to as threshold values hereinafter) in the pseudo random number pattern 401, and sets 1 (white) for a pixel at which the gradation value is equal to or larger than the threshold value) or 0 (black) for a pixel at which the gradation value does not exceed (or is equal to or smaller than) the threshold value. Such binarization may be realized by hardware or implemented by software.

When an input halftone image is large, it is broken up into ranges of 16 pixels(=4×4), as shown in FIG. 4C, and individual ranges 431, 432, . . . are binarized by the aforementioned method to obtain a final dither image. In this case, two-dimensional blocks each consisting of 16(=4×4) pixels (i.e., the order of pattern=4) are used as units.

Alternatively, two-dimensional blocks having other sizes, e.g., 64(=8×8) pixels (the order of pattern=8), 256(=16×16) pixels (the order of pattern=16), and the like may be used as processing units.

FIG. 5A shows recurrence formulas used for generating the pseudo random number pattern used in the aforementioned binarization, i.e., a Bayer pattern. For example, if n=2 in FIG. 5A, a pattern of "D4" (the order of pattern=4) (i.e., the pseudo random number pattern 401 shown in FIG. 4A) is obtained. In normal use, since the number of gradation levels of an input halftone image to be binarized is 256 (a gradation value ranges from 0 to 255) expressed by 8 bits, a pattern 501 (FIG. 5B) obtained by multiplying each threshold value in the pattern 401 by 17(=255/15) is popularly used.

When already binarized data (e.g., a binary image, each pixel of which does not assume a value other than 0 indicating black or 255 indicating white) in place of a halftone image, periodic noise components appear in the output image. This will be explained below.

Assume that binarization is done using a pseudo random number pattern 501 shown in FIG. 5B. If the gradation values of the respective pixels of the input image are compared with the individual threshold values in the pattern 501 using:

pixel that satisfies gradation value≧threshold value→white pixel that satisfies gradation value<threshold value→black  (i)

since gradation value≧threshold value always holds for elements with a threshold value=0 in the pattern 501, the corresponding pixel of the dither image always becomes white. As a consequence, if the input image is already binarized, white isolated pixels periodically appear, as indicated by 601 in FIG. 6. Note that 601 in FIG. 6 indicates dither image blocks output when an image, all the pixels of which are black (gradation value=0) is input using the pseudo random number pattern 501. Since the upper left threshold value in the pattern 501 is 0, a pixel at that position in each output dither image block 601 is white.

On the other hand, if the gradation values of the respective pixels of the input image are compared with the individual threshold values in the pattern 501 using:

pixel that satisfies gradation value>threshold value→white pixel that satisfies gradation value≦threshold value→black  (ii)

since gradation value≦threshold value always holds for elements with a threshold value=255 in the pattern 501, the corresponding pixel of the dither image always becomes black. As a consequence, if the input image is already binarized, black isolated pixels periodically appear, as indicated by 602 in FIG. 6. Note that 602 in FIG. 6 indicates dither image blocks output when an image, all the pixels of which are white (gradation value=255) is input using the pseudo random number pattern 501. Since the lower left threshold value in the pattern 501 is 255, a pixel at that position in each output dither image block 602 is black.

If a method of comparing an input image with a fixed threshold value (e.g., 128) is used, such problems are not posed. However, a binary image obtained from an input halftone image by such method cannot be used.

SUMMARY OF THE INVENTION

The present invention has been made in consideration of the conventional problems, and has as its object to provide an image processing apparatus, which can prevent noise, i.e., periodic appearance of white or black isolated pixels even when an already binarized image is input in binarization that normally receives a halftone image, and can obtain a dither image having quality as high as that obtained by the conventional method even when a halftone image is input.

In order to achieve the above object, an image processing apparatus of claim 1 comprises input means for inputting digital image data, pseudo random number pattern generation means for generating a pseudo random number pattern which consists of, as elements, threshold values set at substantially equal intervals without containing minimum and maximum gradation values of pixels of the input image data, and binarization means for binarizing the input image data by ordered dithering using the pseudo random number pattern.

The invention of claim 2 is directed to a storage medium which stores a binarization program for binarizing and outputting input digital image data, the binarization program comprising the input step of inputting digital image data, the pseudo random number pattern generation step of generating a pseudo random number pattern which consists of, as elements, threshold values set at substantially equal intervals without containing minimum and maximum gradation values of pixels of the input image data, and the binarization step of binarizing the input image data by ordered dithering using the pseudo random number pattern.

BRIEF DESCRIPTION OF THE DRAWINGS

FIG. 3 shows an example of a pseudo random number pattern;

FIGS. 4A to 4C respectively show the principle of conventional binarization based on "ordered" dithering and examples of input images;

FIGS. 5A and 5B respectively show recurrence formulas and an example of a pattern; and FIG. 6 shows noise that appears upon inputting a binary image in the conventional binarization.

DESCRIPTION OF THE PREFERRED EMBODIMENT

The preferred embodiment of the present invention will be described hereinafter with reference to the accompanying drawings.

The principle of the present invention will be explained first. The aforementioned problem is posed since the two-dimensional pattern of pseudo random numbers used as threshold values contain values "0" or "255" (minimum or maximum gradation value). For this reason, the present invention generates a pseudo random number pattern that does not contain such values. More specifically, the minimum and maximum gradation values of input image data are not contained, and values (threshold values) of individual elements of the pattern are set at nearly equal intervals to maintain high quality upon binarizing a halftone image.

More specifically, a pseudo random number pattern is obtained by adding 1 to and multiplying each of the elements of the Bayer pattern by:

(Number of Gradation Levels of Input Image−1)/(Order of Pattern$^2$+1)     (A)

Note that ^2 indicates a square. For example, when an input image has 256 graduation levels and an order=4, each added element of a pattern 401 shown in FIG. 4A is multiplied by $(256-1)/(4^2+1)=255/17=15$ to obtain a pseudo random number pattern 301 shown in FIG. 2. Since this pattern 301 consists of elements other than 0 (minimum gradation value) and 255 (maximum gradation value) input as a binary image, no noise shown in FIG. 6 appears. Since the pattern 301 shown in FIG. 3 contains threshold values set at equal intervals, dithering with quality as high as that obtained by the conventional method can be attained even when a halftone image is input.

When the input image has 256 gradation levels and an order=4, formula (A) is divisible and its quotient is an integer. However, in case of other numbers of gradation levels and other orders of the pattern, formula (A) above is indivisible and the quotient obtained in such case must be rounded. "Nearly equal intervals" means that such cases are included. That is, threshold values need only be set at intervals that can obtain a dither image with high quality even when a halftone image is input.

Figure 1:
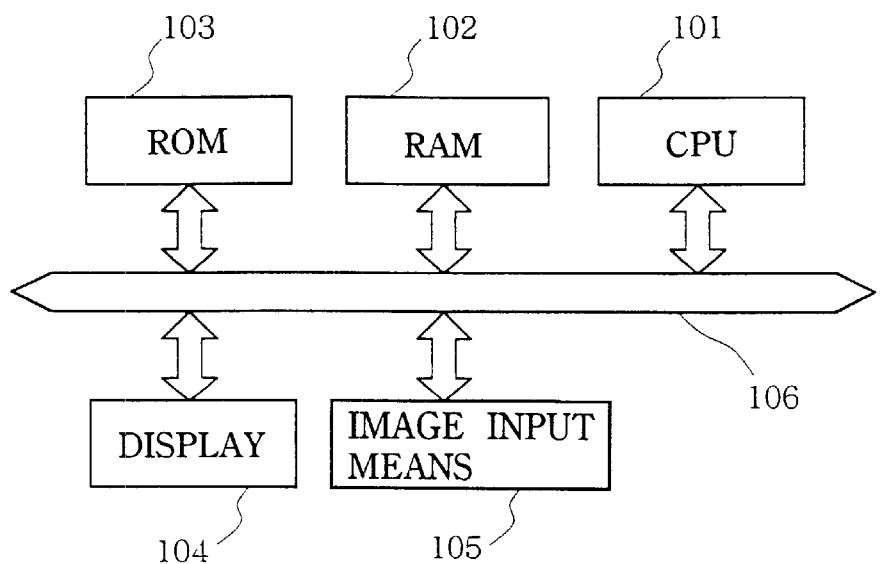
FIG. 1 is a block diagram showing an image processing apparatus according to the present invention.

FIG. 1 shows the block arrangement of an image processing apparatus according to the present invention. This apparatus comprises a CPU (central processing unit) 101, random-access memory (RAM) 102, read-only memory (ROM) 103, display 104, image input means 105, and bus line 106. The image input means inputs a halftone image or already binarized image to the apparatus of the present invention, and may input such images via storage media such as a floppy disk, CD-ROM, and the like, or may input image data captured by, e.g., a scanner. The CPU 101 binarizes image data input from the image input means 105 by executing a program stored in the ROM 103 (note that the CPU 101 need not always receive image data input from the image input means 105 but may use image data stored in the ROM 103 or RAM 102). The binarized image data is stored in a storage means (not shown) or is displayed on the display 104. The RAM 102 is used as a work area of the CPU 101 or that of input image data or output image data.

Figure 2:
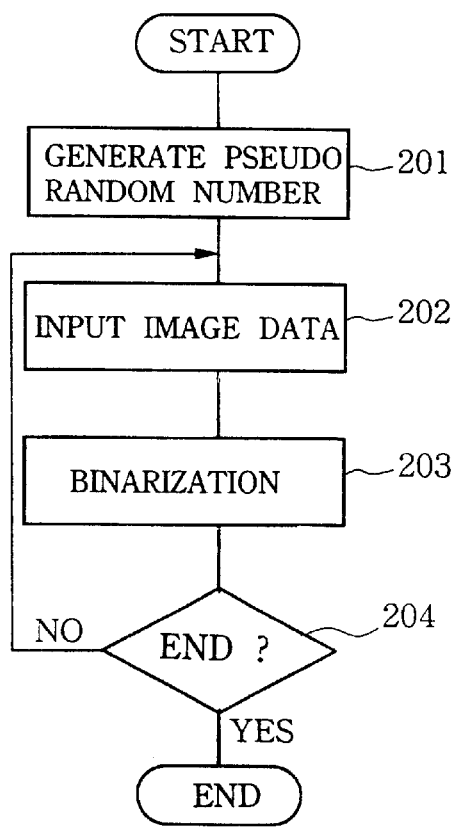
FIG. 2 is a flow chart showing the binarization sequence.

FIG. 2 is a flow chart showing the binarization sequence in the apparatus shown in FIG. 1. In step 201, a pseudo random number pattern is generated. The pattern to be generated contains neither the minimum value nor maximum value of the gradation values of input image data, and values (threshold values) of the individual elements of the pattern are set at nearly equal intervals, as described above. For example, when an input image has 256 gradation levels and an order=4, a pattern 301 shown in FIG. 3 is generated. In step 202, image data is input. The image data is input in units of two-dimensional blocks corresponding to the order of the pattern. As the input image data, already binarized image data may be input in addition to a halftone image. In step 203, the same binarization as that explained previously with reference to FIGS. 4A to 4C is done using the pseudo random number pattern (e.g., the pattern 301 in FIG. 3) generated in step 201. That is, the gradation values of individual pixels of the input image data are compared with the corresponding threshold values of the pattern 301 shown in FIG. 3, and binarization is done by determination based on relation (i) or (ii) above. Irrespective of which one of relations (i) and (ii) is used, since the threshold values of the pseudo random number pattern used do not contain the minimum and maximum gradation values, noise components, i.e., black or white isolated pixels can be prevented from periodically appearing. It is then checked in step 204 if all the image data to be processed have been binarized. If input image data remain, the flow returns to step 202 to continue the processing. If it is determined in step 204 that all the image data have been processed, the binarization ends.

The aforementioned binarization program is stored in the ROM 102. Alternatively, the program may be stored in a storage medium such as an FD, CD-ROM, or the like, and may be executed after it is read out therefrom, or a program installed on a hard disk from the FD or CD-ROM may be used.

In the above embodiment, the binarization is implemented by software but may be implemented by hardware. The present invention is not limited to the above-mentioned formula for obtaining a pattern, but may use various other formulas. Note that the element values of the patterns are preferably distributed at nearly equal intervals. This is to maintain high quality upon binarizing a halftone image.

To restate, according to the present invention, even when an already binarized image is input in binarization that normally receives a halftone image, noise components, i.e., black or white isolated pixels can be prevented from periodically appearing. In addition, when a halftone image is input, a dither image with quality as high as that obtained by the conventional method can be obtained. Hence, binarization can be appropriately done independently of the type of input image, i.e., a halftone image or already binarized image, that is, the type of input image, i.e., a halftone image or already binarized image need not be taken into consideration.

What is claimed is:

1. An image processing apparatus comprising:

input means for inputting digital image data;

pseudo random number pattern generation means for generating a pseudo random number pattern which is made of, as elements, threshold values set at substantially equal intervals without containing minimum and maximum gradation values of pixels of the input image data, wherein the pseudo random number pattern is generated by adding 1 to individual elements of a threshold value matrix and multiplying each element by:

(Number of Gradation Levels of Input Image−1)/(Order of Pattern^2+1);

and binarization means for binarizing the input image data by ordered dithering using the pseudo random number pattern.

2. A storage medium which stores a binarization program for binarizing and outputting input digital image data, said binarization program comprising:

the input step of inputting digital image data;

the pseudo random number pattern generation step of generating a pseudo random number pattern which is made of, as elements, threshold values set at substantially equal intervals without containing minimum and maximum gradation values of pixels of the input image data, wherein the pseudo random number pattern is generated by adding 1 to individual elements of a threshold matrix and multiplying each element by:

(Number of Gradation Levels of Input Image−1)/(Order of Pattern^2+1);

and the binarization step of binarizing the input image data by ordered dithering using the pseudo random number pattern.

* * * * *